(12) United States Patent
Froc

(10) Patent No.: US 9,236,950 B2
(45) Date of Patent: Jan. 12, 2016

(54) METHOD AND DEVICE FOR DETERMINING A PRESENCE OF A LOCKING SIGNAL IN A SIGNAL RECEIVED BY AN OPTICAL RECEIVER DEVICE

(71) Applicant: Gwillerm Froc, Rennes (FR)

(72) Inventor: Gwillerm Froc, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/374,118

(22) PCT Filed: Jan. 22, 2013

(86) PCT No.: PCT/EP2013/051121
§ 371 (c)(1),
(2) Date: Jul. 23, 2014

(87) PCT Pub. No.: WO2013/110597
PCT Pub. Date: Aug. 1, 2013

(65) Prior Publication Data
US 2015/0030340 A1 Jan. 29, 2015

(30) Foreign Application Priority Data
Jan. 24, 2012 (EP) .................................. 12152275

(51) Int. Cl.
*H04B 10/60* (2013.01)
*H04B 10/07* (2013.01)
(52) U.S. Cl.
CPC ............... *H04B 10/60* (2013.01); *H04B 10/07* (2013.01)

(58) Field of Classification Search
CPC ....... H04B 10/07; H04B 10/60; H04J 14/0257; H04J 14/0258
USPC .............. 398/25, 151, 58, 66–68, 70–72
See application file for complete search history.

(56) References Cited

U.S. PATENT DOCUMENTS

| | | | |
|---|---|---|---|
| 5,140,701 A | 8/1992 | Zaks | |
| 5,208,819 A | 5/1993 | Huber | |
| 2003/0142320 A1* | 7/2003 | Mells | G01J 9/04 356/484 |
| 2006/0291870 A1* | 12/2006 | Wan | H04B 10/505 398/183 |
| 2008/0138072 A1* | 6/2008 | Sakamoto | H04J 14/0226 398/68 |
| 2011/0095927 A1 | 4/2011 | Pagnanelli | |
| 2013/0004174 A1* | 1/2013 | Lee | H04J 14/0246 398/79 |
| 2013/0216228 A1* | 8/2013 | Nazarathy | H04B 10/272 398/65 |

OTHER PUBLICATIONS

International Search Report Issued May 15, 2013 in PCT/EP13/051121 Filed Jan. 22, 2013.

* cited by examiner

*Primary Examiner* — Dalzid Singh
(74) *Attorney, Agent, or Firm* — Oblon, McClelland, Maier & Neustadt, L.L.P.

(57) ABSTRACT

A method for determining a presence of a locking signal in a signal received by an optical receiver device, the optical receiver device configured to be used in an optical communications network, the locking signal being a signal exchanged by optical communication devices of the optical communications network in a phase preceding setting up communications between the optical communication devices. The presence of the locking signal is determined by obtaining a direct current component or a component at twice a frequency at which the locking signal is supposed to be modulated, and by obtaining a contribution of the communication signal, if any, on the component.

15 Claims, 8 Drawing Sheets

METHOD AND DEVICE FOR DETERMINING A PRESENCE OF A LOCKING SIGNAL IN A SIGNAL RECEIVED BY AN OPTICAL RECEIVER DEVICE

BACKGROUND OF THE INVENTION

The present invention generally relates to optical communications networks and more particularly to configuring the carrier wavelength to be used by a first optical communication device to communicate with a second optical communication device.

Optical communications networks, and more particularly passive optical communications networks, are increasingly used to give network access to residential or office gateways or to ensure mobile backhauling for instance.

In an attempt to increase the number of users to be served by one access system to the network, wavelength or frequency division multiplexing technologies have been developed. These technologies take advantage of multiplexing several optical signals using different carrier wavelengths or frequencies on a single optical fiber. Even though some user terminals may share the same carrier wavelength or frequency, a wavelength or frequency splitter is typically used to separate the different wavelengths, or frequencies, in order to increase the number of simultaneous optical transmissions. The wavelength or frequency splitter is typically placed between the user terminals and a terminal providing access to the rest of the network. For instance this latter terminal provides access to a metropolitan network or a core network. Different techniques can be used to achieve the wavelength or frequency splitting. We can cite thin films based systems, interference cavities as AWG (Array Wavelength Gratings) and FBG (Fiber Bragg Gratings).

The wavelength or frequency splitter then comprises several optical band-pass filters, for each direction of communications. It is used to filter and combine optical signals issued by the user terminals toward the terminal giving access to the metropolitan or core network. In the other direction, it is used to filter and spectrally split the optical signals issued by the terminal giving access to the metropolitan or core network.

BRIEF SUMMARY OF THE INVENTION

The difficulty in such an arrangement is to configure the transmission interfaces of the terminals. Indeed, these transmission interfaces shall be configured so that the carrier wavelengths, or frequencies, effectively used are substantially equal to the nominal wavelengths or frequencies of the respective optical band-pass filters to which they are connected. There is therefore a need to lock said carrier wavelengths, or frequencies, for setting up communications between a first optical communication device and a second optical communication device separated by such optical band-pass filters.

In order to perform this frequency locking, a locking protocol is implemented. An initiating device among the first and second optical communication devices transmits a locking signal to the other optical communication device using a given carrier wavelength or frequency. This may generate interferences to communications already setup. Such interferences are even more present when using a wavelength or frequency splitter, as it may require scanning various frequencies or wavelengths in order to match the nominal frequency or wavelength of the splitter.

It is desirable to overcome the aforementioned problems, which occur in optical communications networks. In particular, it is desirable to provide a solution that allows performing frequency or wavelength locking for setting up a new communication in an optical communications network in which communications may already be setup, without disrupting such already-setup communications.

It is also desirable to provide a solution that allows reducing the interferences generated on already-setup communications in an optical communications network when configuring communication devices for setting up a new communication.

It is furthermore desirable to provide a solution that allows an optical receiver device determining that a locking signal is being received from another optical communication device, while the optical receiver device is involved in communications already setup in the optical communications network, and without disrupting such already-setup communications. It is furthermore desirable to provide a solution that allows an optical receiver device determining such a locking signal being received.

It is furthermore desirable to provide a solution that allows increasing the optical power budget for performing the locking operation, while limiting the impact on the extent of the optical communications network.

It is furthermore desirable to provide a cost-effective solution to the aforementioned problems.

The present invention also concerns a method for determining a presence of a locking signal in a signal received by an optical receiver device, the optical receiver device being intended to be used in an optical communications network, the locking signal being a signal exchanged by optical communication devices of the optical communications network in a phase preceding setting up communications between said optical communication devices. The optical receiver device performs: obtaining, from the received signal, a direct current component or a component at twice a frequency at which the locking signal is supposed to be modulated; determining a presence in the received signal of a communication signal resulting from a communication between optical communication devices of the optical communications network; and, when the presence of the communication signal is detected in the received signal: determining a contribution of the communication signal on the direct current component or respectively on the component at twice a frequency at which the locking signal is supposed to be modulated; determining whether the locking signal is present in the received signal by subtracting at least, from the direct current component or respectively from the component at twice a frequency at which the locking signal is supposed to be modulated, the determined contribution of the communication signal.

Thus, by identifying the contribution of the communication signal on the direct current component or on the component at twice a frequency at which the locking signal is supposed to be modulated, if any, the optical receiver device is able to detect the presence of a locking signal received concurrently to the communication signal. Obtaining direct current components only requiring a low-pass filter, the solution is cost-effective. Regarding the component at twice a frequency at which the locking signal is supposed to be modulated, the optical signal-to-noise ratio to detect the locking signal is greater than for the alternative related to the direct current component, which allows decreasing the minimum of light necessary for performing the locking signal detection and thus increasing the optical power budget for performing the locking operation, while limiting the impact on the extent of the optical communications network.

According to a particular feature, the optical receiver device being adapted to receive signals via a photodiode, determining whether the locking signal is present in the received signal further comprises, when subtracting from the direct current component, further subtracting a dark current resulting from the photodiode.

Thus, the imperfections related to the photodiode design are taken into account.

According to a particular feature, determining the contribution of the communication signal on the direct current component comprises: obtaining a direct current component of the received signal, when the received signal is received during a time period during which no locking signal is supposed to be received; subtracting, from said obtained direct current component, the dark current resulting from the photodiode.

Thus, as a low-pass filter is only required to obtain the contribution of the communication signal on the direct current component, the solution is cost-effective.

According to a particular feature, determining the contribution of the communication signal on the direct current component comprises: obtaining an indication of a modulation scheme in use for transmitting the communication signal between optical communication devices; obtaining a spectrum pattern on the basis of the obtained indication of the modulation scheme in use; extrapolating the contribution of the communication signal on the direct current component on the basis of the obtained pattern and samples of the received signal.

Thus, the contribution of the communication signal on the direct current component may be obtained without constraints on the time periods during which the communications signal and the locking signal may be transmitted.

According to a particular feature, the optical receiver device further performs: associating the obtained contribution of the communication signal on the direct current component with an identifier of an optical transmitter device having transmitted the communication signal throughout the optical communications network; storing the associated contribution and identifier, for a later determination of a presence of a locking signal in a received signal.

Thus, the processing resources to detect later on a locking signal are limited.

According to a particular feature, determining the contribution of the communication signal on the component at twice the frequency at which the locking signal is supposed to be modulated comprises obtaining a component of the received signal at twice the frequency at which the locking signal is supposed to be modulated, when the received signal is received during a time period during which no locking signal is supposed to be received.

Thus, the contribution of the communication signal on the component at twice the frequency at which the locking signal is supposed to be modulated can simply be obtained by measurement.

According to a particular feature, determining the contribution of the communication signal on the component at twice the frequency at which the locking signal is supposed to be modulated comprises: obtaining an indication of a modulation scheme in use for transmitting the communication signal between optical communication devices; obtaining a spectrum pattern on the basis of the obtained indication of the modulation scheme in use; extrapolating the contribution of the communication signal on the component at twice the frequency at which the locking signal is supposed to be modulated on the basis of at least the obtained pattern and samples of the received signal.

Thus, the contribution of the communication signal on the component at twice the frequency at which the locking signal is supposed to be modulated may be obtained without constraints on the time periods during which the communication signal and the locking signal may be transmitted.

According to a particular feature, extrapolating the contribution of the communication signal on the component at twice the frequency at which the locking signal is supposed to be modulated is further performed on the basis of a contribution of the communication signal on a direct current component of the received signal.

Thus, the accuracy of the extrapolating is increased.

According to a particular feature, the optical receiver device further performs: associating the obtained contribution of the communication signal on the component at twice the frequency at which the locking signal is supposed to be modulated with an identifier of an optical transmitter device having transmitted the communication signal throughout the optical communications network; storing the associated contribution and identifier, for a later determination of a presence of a locking signal in a received signal.

Thus, the processing resources to detect later on a locking signal are limited.

According to a particular feature, the method further comprises, when the presence of the communication signal is detected in the received signal: determining positions of tones in the received signal, said tones being supposed to be present in each communication signal; determining a beating frequency and a phase shift on the basis of the determined positions of the tones, said beating frequency being a difference between a first carrier frequency used to transmit the communication signal throughout the optical communications network and a second carrier frequency used to transmit the locking signal throughout the optical communications network, said phase shift being a difference between a first phase used to transmit the communication signal throughout the optical communications network and a second phase used to transmit the locking signal throughout the optical communications network; and in that determining whether the locking signal is present in the received signal is further performed on the basis of determined beating frequency and phase shift.

Thus, thanks to the determining of the beating frequency and the phase shift, the contribution of the interference resulting from the simultaneous reception of the locking signal and of the communication signal can be determined and compensated.

According to another aspect, the present invention concerns a method for generating a locking signal by an optical transmitter device, the locking signal being a signal exchanged by optical communication devices of an optical communications network in a phase preceding setting up communications between said optical communication devices. The optical transmitter device performs: obtaining a carrier frequency to transmit the locking signal throughout the optical communications network; obtaining a modulated signal, the signal being modulated at a frequency that is lower than the lower limit of a baseband frequency range corresponding to communication signals transmitted throughout the optical communications network; apodizing the modulated signal; modulating the apodized signal on the basis of the obtained carrier frequency.

Thus, by apodizing the signal, no interference is supposed to be generated by the transient locking signal in the baseband frequency range, and modulating the signal at a frequency that is lower than the lower limit of a baseband frequency range allows simplifying the detection of the locking signal by an optical receiver device.

According to another aspect, the present invention concerns a device for determining a presence of a locking signal in a signal received by said device, said device being intended to be used in an optical communications network, the locking signal being a signal exchanged by optical communication devices of the optical communications network in a phase preceding setting up communications between said optical communication devices. Said device implements: means for obtaining, from the received signal, a direct current component or a component at twice a frequency at which the locking signal is supposed to be modulated; means for determining a presence in the received signal of a communication signal resulting from a communication between optical communication devices of the optical communications network; and, when the presence of the communication signal is detected in the received signal, said device further implements: means for determining a contribution of the communication signal on the direct current component or respectively on the component at twice a frequency at which the locking signal is supposed to be modulated; means for determining whether the locking signal is present in the received signal by subtracting, from the direct current component or respectively from the component at twice a frequency at which the locking signal is supposed to be modulated, the determined contribution of the communication signal.

According to a particular feature, the device being adapted to receive signals via a photodiode, said means for determining whether the locking signal is present in the received signal are further adapted, when subtracting from the direct current component, to further subtract a dark current resulting from the photodiode.

According to a particular feature, the device further implements, when the presence of the communication signal is detected in the received signal: means for determining positions of tones in the received signal, said tones being supposed to be present in each communication signal; means for determining a beating frequency and a phase shift on the basis of the determined positions of the tones, said beating frequency being a difference between a first carrier frequency used to transmit the communication signal throughout the optical communications network and a second carrier frequency used to transmit the locking signal throughout the optical communications network, said phase shift being a difference between a first phase used to transmit the communication signal throughout the optical communications network and a second phase used to transmit the locking signal throughout the optical communications network; and in that said means for determining whether the locking signal is present in the received signal are further adapted, when subtracting from the component at twice a frequency at which the locking signal is supposed to be modulated, to perform the determining on the basis of determined beating frequency and phase shift.

According to another aspect, the present invention concerns a device for generating a locking signal, the locking signal being a signal exchanged by optical communication devices of an optical communications network in a phase preceding setting up communications between said optical communication devices. Said device implements: means for obtaining a carrier frequency to transmit the locking signal throughout the optical communications network; means for obtaining a modulated signal, the signal being modulated at a frequency that is lower than the lower limit of a baseband frequency range corresponding to communication signals transmitted throughout the optical communications network; means for apodizing the modulated signal; means for modulating the apodized signal on the basis of the obtained carrier frequency.

The present invention also concerns a computer program that can be downloaded from a communication network and/or stored on a medium that can be read by a computer and run by a processor. This computer program comprises instructions for implementing the aforementioned methods in any one of their various embodiments, when said program is run by the processor.

The present invention also concerns an information storage means, storing a computer program comprising a set of instructions that can be run by a processor for implementing the aforementioned methods in any one of their various embodiments, when the stored information is read by a computer and run by a processor.

The advantages of the devices and of the computer program being identical to those mentioned with regard to the corresponding methods, they are not repeated here.

BRIEF DESCRIPTION OF DRAWINGS

The characteristics of the invention will emerge more clearly from a reading of the following description of an example of embodiment, said description being produced with reference to the accompanying drawings, among which:

FIG. 1 schematically represents an architecture of a passive optical network in which the present invention may be implemented.

Figure 1:
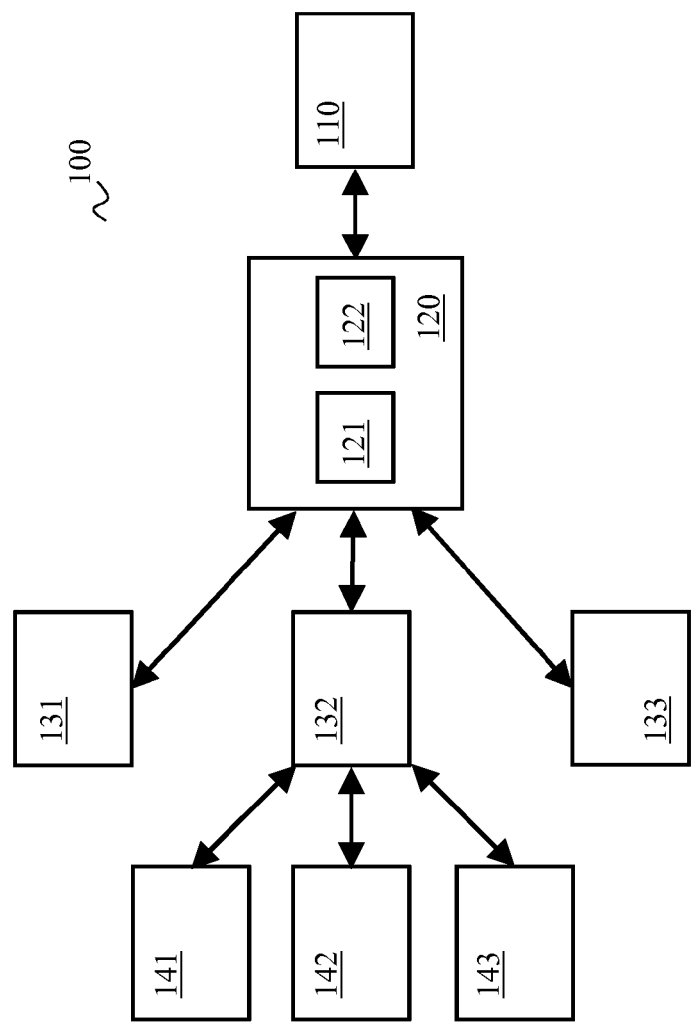
FIG. 1 schematically represents an architecture of an optical communications network in which the present invention may be implemented.

It has to be noticed that, since wavelength and frequency are tied together through a direct inverse relationship, these two terms are indifferently used by the one skilled in the art, as they refer to the same concept.

The description hereafter is detailed in the context of a passive optical communications network, but can be similarly applied in the more general context of optical communications networks.

The passive optical communications network 100 comprises a master device 110, a plurality of slave devices 141, 142, 143, and a spectral splitter device 120. The slave devices 141, 142, 143 are interconnected with the master device 110 via the spectral splitter device 120. Power splitters, as described hereafter, may be placed between the slave devices and the spectral filter device 120 in order to increase the number of slave devices that can be interconnected with the master device 110. All the interconnections of the passive optical communications network 100 are performed by using optical fiber.

In the context of the passive optical communications network 100, the slave devices 141, 142, 143 are of ONU (Optical Network Units) type. ONUs are typically intended to be located at the end-user household.

In the context of the passive optical communications network 100, the master device 110 is of OLT (Optical Line Terminal) type. It enables ONUs to access a metropolitan or a core network (not shown).

The slave devices 141, 142, 143 may be connected to the spectral splitter device 120 via a power splitter device 132. The power splitter device 132 is a passive splitter that separates the input signal, in the downlink direction, into a plurality of corresponding signals which power is divided by the number of links towards the slave devices 141, 142, 143. The signals output by the power splitter device 132, on each link in the downlink direction, contain the same information as the input signal, the power splitter device 132 having only impact on the power of the signals.

Other slave devices may be connected to the spectral splitter device 120 via power splitter devices 131, 133. Each power splitter device 131, 132, 133, and the slave devices connected to, form a network of PON (Passive Optical Network) type with the OLT. The PONs operate on respective wavelength bands, as filtered by the spectral splitter device 120. To achieve this, the spectral splitter device 120 comprises a pair of optical band-pass filters for each PON, aiming at filtering respective wavelength bands, and thus enabling the spectral splitter device 120 to perform Wavelength Division Multiplexing.

Therefore, as shown on FIG. 1, the spectral splitter device 120 comprises optical band-pass filters 121 and 122 dedicated to the transmissions over the PON of the power splitter device 132 and its associated slave devices 141, 142, 143. The first filter 122, called hereinafter uplink filter, is in charge of filtering the optical signals in the uplink direction, i.e. from the slave devices 141, 142, 143 to the master device 110. The second filter 121, called hereinafter downlink filter, is in charge of filtering the optical signals in the downlink direction, i.e. from the master device 110 to the slave devices 141, 142, 143. Each filter 121, 122 is a band-pass filter defined by a nominal wavelength, also referred to as centre wavelength, as well as a bandwidth. Each filter 121, 122 may also be defined by a spectral shape.

For a considered uplink or downlink direction, all the filters of the spectral splitter device 120 have preferably the same bandwidth value and are preferably spaced by a fixed spectral distance. However, the nominal wavelengths of the filters are a priori unknown. The spectral splitter device 120 being preferably passive, the nominal wavelengths of the filters may vary as a function of the temperature of the spectral splitter device 120.

It has to be noticed that, the band-pass filters being designed upon the same constraints, the bandwidth value of the filters and the spectral distance between the filters are substantially independent of the temperature variations.

In addition, the effective carrier wavelength corresponding to a given configuration of the optical transmission interface of either a slave device 141, 142, 143 or the master device 110 may not be known.

Therefore, the slave devices 141, 142, 143 need to be configured for transmitting optical signals in the uplink direction on carrier wavelengths that are substantially equal to the nominal frequency of the uplink filter 122. In addition, the master device 110 needs to be configured for transmitting optical signals in the downlink direction on a carrier wavelength that is substantially equal to the nominal frequency of the downlink filter 121. In other words, carrier frequencies need to be locked.

It can be noticed that a wavelength in the passband of a given filter is considered as substantially equal to the nominal frequency of said given filter.

It can be noted that the nominal wavelengths of the filters 121, 122 may be identical. It means that either a same carrier wavelength or different carrier wavelengths can be used in the downlink and uplink directions.

In order to allow locking the carrier frequency between a first optical communication device, such the slave device 141, and a second optical communication device, such as the master device 110, the first optical communication device transmits a locking signal throughout the optical communications network 100.

This locking signal is transmitted over a carrier frequency or wavelength selected by the first optical communication device. In order to avoid generating interferences to communications already setup in the optical communications network 100, for instance between the master device 110 and the slave device 142, it is proposed to generate a particularly shaped locking signal, as detailed hereafter with regard to FIG. 3. Any receiver device of the optical communications network 100, such as the second optical communication device, is then able to distinguish the locking signal from signals of an already-setup communication, as detailed hereafter with regard to FIGS. 4 to 9. Moreover, said receiver device is able to continue decoding the signals exchanged within said already-setup communication.

Figure 2:
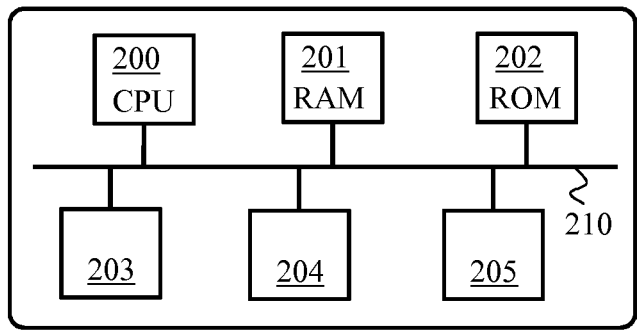
FIG. 2 schematically represents an architecture of a communication device of the optical communications network.

FIG. 2 schematically represents an architecture of the master device 110.

According to the shown architecture, the master device 110 comprises the following components interconnected by a communications bus 210: a processor, microprocessor, microcontroller or CPU (Central Processing Unit) 200; a RAM (Random-Access Memory) 201; a ROM (Read-Only Memory) 202; a device 203 adapted to read information stored on storage means; a first communication interface 204, aiming at being connected to the spectral splitter device 120 for transmitting and receiving optical signals; and, a second communication interface 205, aiming at being connected to the metropolitan or core network.

CPU 200 is capable of executing instructions loaded into RAM 201 from ROM 202 or from any other storage means. After the master device 110 has been powered on, CPU 200 is capable of reading instructions from RAM 201 and executing these instructions. The instructions form one computer program that causes CPU 200 to perform some or all of the steps of the algorithms described hereafter with regard to FIGS. 3, 5, 7 and 9.

It can be noted that the slave devices 141, 142, 143 may also be implemented on the basis of the architecture schematically shown on FIG. 2. In this case, the first communication interface 204 allows communicating with the master device 110, potentially through the spectral splitter device 120, and the second communication interface 205 allows connecting the considered slave device 141, 142, 143 to a local area network, such as a home network.

Any and all steps of the algorithms described hereafter with regard to FIGS. 3, 5, 7 and 9 may be implemented in software by execution of a set of instructions or program by a programmable computing machine, such as a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 3:
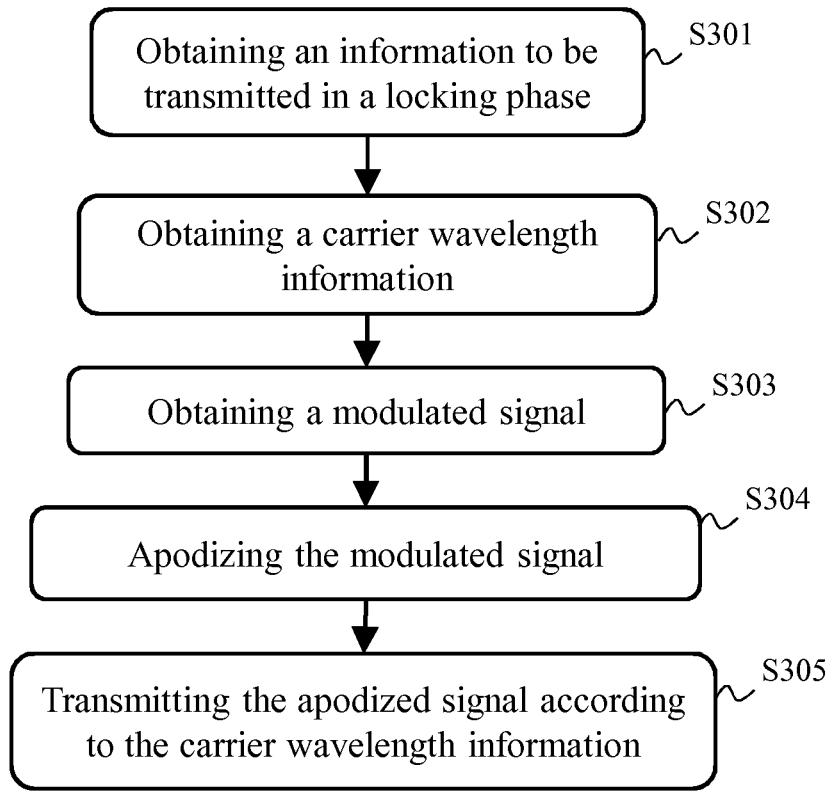
FIG. 3 schematically represents an algorithm, performed by a first optical communication device, for transmitting a locking signal to a second optical communication device in the optical communications network.

FIG. 3 schematically represents an algorithm, performed by the first optical communication device, for transmitting a locking signal to the second optical communication device. The first optical communication device is also referred to as optical transmitter device.

The algorithm of FIG. 3 aims at being performed when the first optical communication device tries to setup a communication with the second optical communication device. As already mentioned, such communications require that the frequencies of the communications signals be properly locked beforehand.

In a particular embodiment, the algorithm of FIG. 3 aims at being reiterated with a new carrier or wavelength frequency when the first optical communication device doesn't receive in response a message or signal from the second optical communication device.

In a step S301, the first optical communication device obtains information to be transmitted from the first optical communication device to the second optical communication device in a locking phase in order to allow setting up a communication between the first and second optical communication devices.

In a following step S302, the first optical communication device obtains information representative of a carrier frequency to be used for the communication to be setup between the first and second optical communication devices.

In a following step S303, the first optical communication device obtains a modulated signal from the information obtained in the step S301. In a particular embodiment, the modulation is performed by a circular function which frequency $\Omega$ is lower than the baud rate of the effective communications between optical communication devices in the optical communications network 100. In other words, the frequency $\Omega$ is lower than the lower limit of the baseband, the baseband corresponding to the range of frequencies that are necessary to decode the communication signals. In a preferred embodiment, the frequency $\Omega$ is significantly lower than the lower limit of the baseband. For instance, the frequency $\Omega$ equals 50 MHz and the lower limit of the baseband is 1.80 THz.

In a following step S304, the first optical communication device apodizes the modulated signal. In other words, the first optical communication device removes or smoothes sharp discontinuities in the modulated signal. To achieve this, the first optical communication device uses for instance Blackman window filtering. Another window filtering process, or apodization process, may be applied instead, such as Hann window filtering. In a variant, the circular function is a sine function and the first optical communication device starts the sine function at 0 and ends the sine function at $k\pi$, wherein k is a positive integer. The first optical communication device thus ensures that the apodized modulated locking signal smoothly tends toward 0 at the beginning and at the end of the signal so that no transient high frequencies are generated in the signal.

The locking signal after apodization is denoted $S_{lock}(t)$ hereafter, wherein t represents time. The locking signal $S_{lock}(t)$ corresponds to a signal $S''_{lock}(t)$ after apodization, wherein the signal $S''_{lock}(t)$ may be expressed as follows:

$$S''_{lock}(t) = \alpha_0 + \alpha_1 \times \cos(\Omega t + \phi)$$

wherein $\alpha_0$, and $\alpha_1$ are constant values, with $\alpha_0 \geq 0$ and $\alpha_1 \neq 0$. In this case, $\alpha_0$ represents the information obtained in the step S301. The conjunction of $\alpha_0$ and $\alpha_1$ may represent such information.

The locking signal $S_{lock}(t)$ is for instance representative of a message comprising an indication that a communication has to be set up, an identifier of the first optical communication device and an identifier of the second optical communication device. The locking signal $S_{lock}(t)$ may also be only representative of an indication that a communication has to be set up, the identifiers of the first and second optical communication devices being predefined or exchanged using another communication channel.

In a following step S305, the first optical communication device transmits the locking signal $S_{lock}(t)$ to the second optical communication device throughout the optical communications network 100. The signal is transmitted using the carrier frequency identified by the information obtained in the step S302. The transmitted signal may be received by other optical communication devices than the second optical communication device to which the signal is addressed.

To transmit the signal to the second optical communication device, the first optical communication device modulates the locking signal $S_{lock}(t)$ with a sine function. The resulting signal may then be expressed as follows:

$$S_{lock}(t) \times \cos(\omega_{lock} t + \phi_{lock})$$

wherein:
- $\omega_{lock}$ represents the carrier frequency obtained in the step S302;
- $\phi_{lock}$ represents the phase of the sine function applied in the modulation performed in the step S305; and
- $\phi$ represents the phase of the circular function applied in the modulation performed in the step S303.

For comparison, a communication signal $S_{com}(t)$ that is modulated by an optical communication device for communicating with another optical communication device, once the carrier frequency is locked, may be expressed as follows:

$$S_{com}(t) \times \cos(\omega_{com} t + \phi_{com})$$

wherein:
- $\omega_{com}$ represents the carrier frequency used to transmit the communication signal $S_{com}(t)$ during the communication between the optical communication devices; and
- $\phi_{com}$ represents the phase of the sine function applied to perform the communication.

As an example, the frequency $\Omega$ is set to 50 MHz and the carrier wavelengths or frequencies $\omega_{lock}$ and $\omega_{com}$ are within 1.80 THz to 2.30 THz, which corresponds to the infrared frequency domain.

The transmitted signal may be received by the second optical communication device, whereas the second optical communication device already communicates with another optical communication device. It may also be received by another optical communication device, which may communicate with yet another optical communication device, or with the first or the second optical communication device.

Each optical communication device comprises a photodiode, which is for instance an infrared frequency domain APD (Avalanche PhotoDiode) or PIN (Positive Intrinsic Negative) diode. The photodiode is a quadratic detector, which receives the signals transmitted by other communication devices and propagated throughout the optical communications network 100. The photodiode converts the light signals in electrical signals. The photodiode may comprise a TIA (TransImpedance Amplifier) converting current to voltage. The expressions hereinafter of the electrical signal provided by the photodiode shall in this case be transposed in the voltage domain and could be modified by an amplification factor.

The electrical signal provided by the photodiode may be expressed as follows, when the optical communication device receives a communication signal $S_{com}(t)$ corresponding to a communication setup with another optical communication device and when no locking signal is received:

$$I_D + \tfrac{1}{2} S_{com}^2(t)$$

wherein $I_D$ represents the dark current, which is the current provided by the photodiode in the absence of light signals.

This involves BB (BaseBand) components and a DC (Direct Current) component at least related to the dark current. The BB components are located in the baseband, which is for instance defined as the range from 1 GHz to 10 GHz. The baseband corresponds to the spectrum range in which are located the components resulting from the communication signal $S_{com}(t)$ that are significant to perform the decoding of the communication signal $S_{com}(t)$.

The communication signal $S_{com}(t)$ may also generate part of the DC component, depending on the modulation in use for generating the baseband signals. The modulation in use may intrinsically generate a DC component. The DC component generated by the modulation in use for generating the baseband signals may also evolve over time: it may exist over a given timeframe and not exist over another timeframe. It typically depends on the number of samples over which the signal is considered.

In the following formulas, the operation related to the apodization performed when generating the locking signal $S_{lock}(t)$ is not apparent. It indeed simplifies the formulas and the general understanding of the present invention, as the apodization only aims at ensuring that there is no extra frequency only related to locking signal transitions.

The electrical signal provided by the photodiode may be expressed as follows, when the optical communication device receives a locking signal $S_{lock}(t)$ transmitted by the first optical communication device in the step S305, and when no communication signal is received:

$$I_D + \tfrac{1}{2} S_{lock}^2(t)$$

The electrical signal provided by the photodiode may be expressed as follows, when the optical communication device receives a communication signal $S_{com}(t)$ corresponding to a communication setup with another optical communication device, as well as a locking signal $S_{lock}(t)$ corresponding to a locking signal transmitted by the first optical communication device in the step S305:

$$I_D + \tfrac{1}{2} S_{com}^2(t) + \alpha + C$$

wherein:

$$\alpha = \tfrac{1}{2} S_{lock}^2(t)$$

$$C = S_{com}(t) \times S_{lock}(t) \times \cos((\delta\omega)t + \delta\phi)$$

and wherein:

$$\delta\omega = \omega_{com} - \omega_{lock} \text{ and } \delta\phi = \phi_{com} - \phi_{lock}$$

and wherein $\alpha$ can further be expressed as follows:

$$\alpha = A + B + Z$$

The part A of the electrical signal provided by the photodiode corresponds to part, if any, of the DC component, the part B of the electrical signal provided by the photodiode corresponds to at least part of a component at twice the frequency $\Omega$ and the part Z of the electrical signal provided by the photodiode corresponds to at least part of a component at the frequency $\Omega$.

The frequency $\delta\omega$ is referred hereinafter to as beating frequency, and the phase $\delta\phi$ is referred hereinafter to as phase shift.

Considering for instance $S_{lock}(t) = a_0 + a_1 \times \cos(\Omega t + \phi)$, $\alpha$ can be splitted into the following contributions:

$$A = \frac{1}{2} a_0^2 + \frac{1}{4} a_1^2$$

$$B = \frac{1}{4} a_1^2 \times \cos(2\Omega t + 2\varphi)$$

$$Z = \frac{1}{2} a_1 a_0 \times \cos(\Omega t + \varphi)$$

The part A of the electrical signal provided by the photodiode may generate part of the DC component, for instance if the signal $S_{lock}(t)$ is constant at least over a given timeframe. In this case, when a locking signal is received by the optical communication device, an increase of the DC component is detected, compared to the single presence of the dark current $I_D$.

The part B of the electrical signal provided by the photodiode generates at least part of a component at twice the frequency $\Omega$.

The part C of the electrical signal provided by the photodiode generates respective components related to the beating frequency $\delta\omega$, for instance at the frequencies $\Omega \pm \delta\omega$ when $S_{lock}(t) = a_0 + a_1 \times \cos(\Omega t + \phi)$. Depending on the value of the beating frequency $\delta\omega$, this may result in a DC component and/or a component at twice the frequency $\Omega$ and/or in components overlapping with BB components.

Three embodiments for allowing distinguishing the locking signal from the communication signal at the optical receiver device are presented hereafter. A first embodiment is presented with regard to FIGS. 4 and 5, wherein the DC component is analysed, considering that the part C of the electrical signal provided by the photodiode is mitigated. A second embodiment is presented with regard to FIGS. 6 and 7, wherein the component at twice the frequency $\Omega$ is analysed, considering that the part C of the electrical signal provided by the photodiode is mitigated. A third embodiment is presented with regard to FIGS. 8 and 9, wherein the component at twice the frequency $\Omega$ is analysed, considering that the part C of the electrical signal provided by the photodiode is compensated. Each embodiment results in a different link budget for a given probability of error in symbol detection in the locking signal by the optical communication device receiving the signal, which allows deployment of the optical communications network 100 under different constraints. Indeed, the higher the link budget, the longer the enabled range of the optical communications network 100. A trade-off between complexity of the optical communication devices and the extent of the optical communications network 100 can thus be found, as to increase the extent of the optical communications network 100 for a given link budget, the complexity of the signal detection at the optical receiver devices may be increased, for instance by integrating the received signal over a longer time period for detecting the locking signal.

Figure 4:
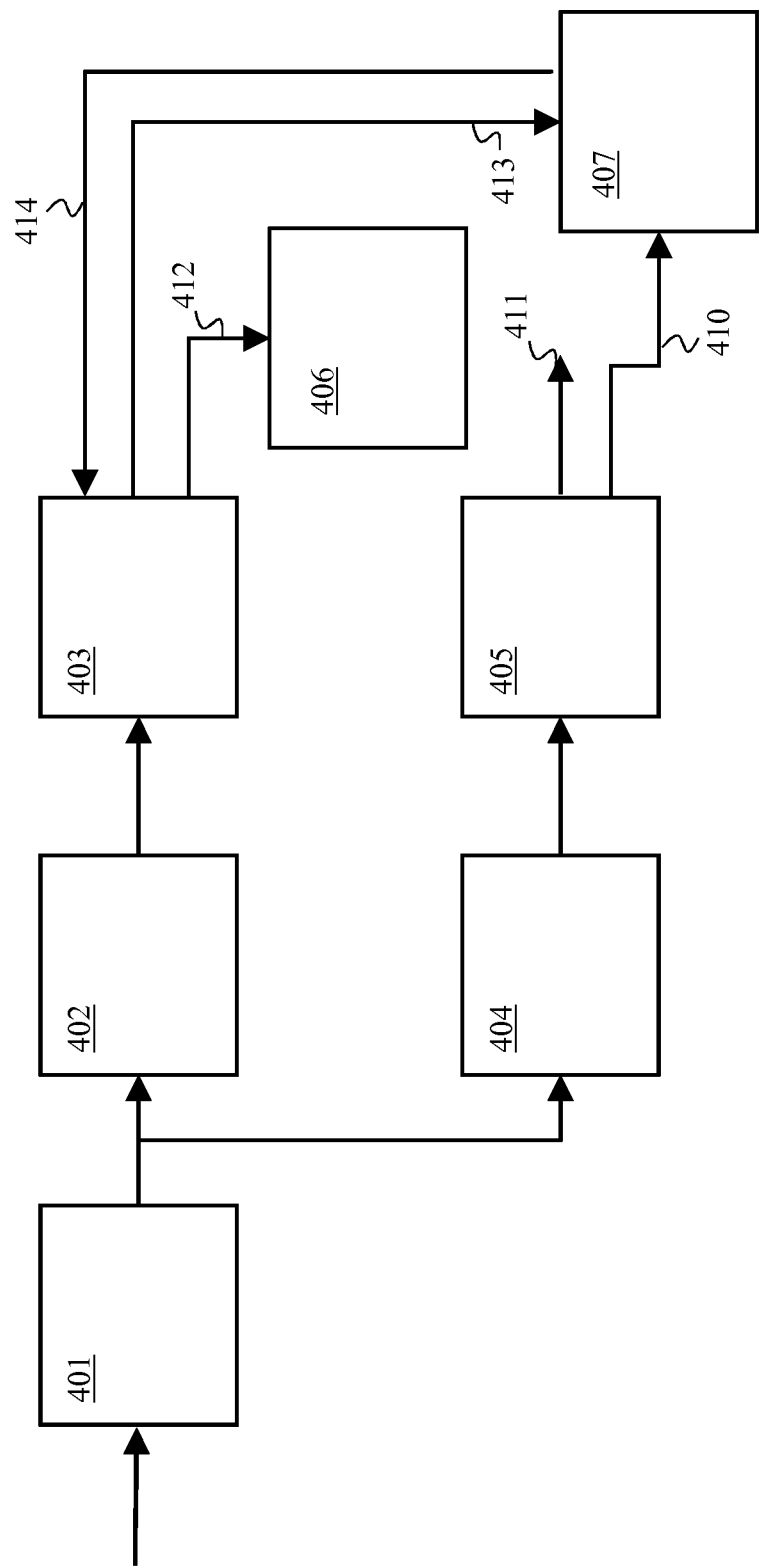
FIG. 4 schematically represents an architecture of a receiver control unit of a communication device of the optical communications network, according to a first embodiment.

FIG. 4 schematically represents an architecture of a receiver control unit of an optical communication device of the optical communications network 100, according to the first embodiment. The optical communication device is hereinafter referred to as optical receiver device.

The first embodiment aims at solving the problem of detecting a locking signal by an optical receiver device, while the optical receiver device is already in communication.

The receiver control unit comprises a photodiode 401, which converts the light signals in electrical signals and provides the electrical signals to a first filter 402 and to a second filter 404.

The first filter 402 is a low-pass filter aiming at filtering, from the other components, the DC component of the electrical signal provided by the photodiode 401. The first filter 402 then provides the DC component to a DC analysing unit 403.

The second filter 404 is a band-pass filter aiming at filtering the BB components of the electrical signal provided by the photodiode 401. The second filter 404 may, in a variant, be a low-pass filter. The second filter 404 then provides the filtered BB components to a BB analysing unit 405.

As already mentioned, the photodiode 401 generates the dark current $I_D$. The dark current $I_D$ corresponds to a DC component, and is therefore filtered by the first filter 401 and provided to the DC analysing unit 403. The DC analysing unit 403 is able to determine the intensity of the dark current $I_D$ when there is no communication signal received from any other optical communication device nor locking signal received from any other optical communication device. To achieve this, the optical receiver device may block in an initialisation phase any reception of light signals until having determined the dark current $I_D$. In a variant, the dark current $I_D$ is set to a predefined value. Indeed, since the dark current $I_D$ is an intrinsic property of the photodiode 401, such predefined value is for instance stored by the optical receiver device during manufacturing process.

The part A of the electrical signal provided by the photodiode 401 is therefore filtered by the first filter 402 and provided to the DC analysing unit 403.

As already mentioned, the part C of the electrical signal provided by the photodiode 401 generates respective components related to the beating frequency $\delta\omega$. This may result in a DC component, which then reinforces the detection of the presence of a locking signal. Indeed, the components related to the beating frequency $\delta\omega$ are only present when locking signals and communication signals overlap. Components at the frequencies $\pm\delta\omega$, and possibly $\pm(\Omega\pm\delta\omega)$, may also overlap with BB components.

In order to render the contribution of the part C of the electrical signal provided by the photodiode 401 negligible in the frequency spectrum of the BB components, the following expression shall be maximized:

$$\frac{S_{com}^2(t)}{C}$$

Considering the worst case wherein $\cos(.)=1$, it results in considering a minimum value for:

$$\frac{S_{com}^2(t)}{S_{lock}(t) \times S_{com}(t)}$$

which could be approximated by:

$$\frac{S_c^2}{S_c \times S_l} = \frac{S_c}{S_l}$$

wherein $S_l$ represents the maximum amplitude of the locking signal $S_{lock}(t)$ and $S_c$ represents the maximum amplitude of the communication signal $S_{com}(t)$. $S_c$ can also represent the mean amplitude of the communication signal $S_{com}(t)$, as only the order of magnitude matters in the formulas above.

For example, using M-ary amplitude modulation (M possible states corresponding to different amplitudes) with $M \leq 16$ to transmit the communication signals, a ratio $S_c/S_l$ greater than 18 dB allows not perturbing the decision-making process regarding the modulation state of a received communication signal. Indeed, in amplitude modulation, equidistant power levels are representative of modulation states, and decision-making threshold are equidistantly defined in between two consecutive power levels. With such a ratio between the maximum amplitude of the locking signal $S_{lock}(t)$ and the maximum amplitude of the communication signal $S_{com}(t)$, the impact of the components corresponding to the part C of the electrical signal provided by the photodiode on the communication signal $S_{com}(t)$ is limited, when such components are located in the baseband. Therefore, considering that the ratio $S_c/S_l$ is greater than 18 dB, it leads to an OSNR (Optical Signal-to-Noise Ratio) $S_c^2/S_l^2$ approximately of 36 dB, which matches the sensitivity of 35 to 40 dB of the photodiodes commonly used in optical communications.

In the case where the optical receiver device receives plural locking signals at the same time, the contribution for the DC component increases linearly with the number of simultaneous locking signals. It generates collisions making the locking signals impossible to decode, but it still provides an indication that such locking signals have been received. In addition, the ratio $S_c^2/S_{c \times \Pi_j} S_{lj}$ would still match the sensitivity of the photodiodes commonly used in optical communications, wherein $S_{lj}$ represents the maximum amplitude of the j-th locking signal.

The DC analysing unit 403 determines the locking signal $S_{lock}(t)$ by analysing the DC component in the received signal. The contribution of the locking signal $S_{lock}(t)$ on the DC component is the DC component observed in the electrical signal provided by the photodiode 401 from which is subtracted the dark current $I_D$ and the contribution on the DC component, if any, of the communication signal $S_{com}(t)$.

The contribution of the communication signal $S_{com}(t)$ on the DC component is determined by measurement, when there is no locking signal $S_{com}(t)$ received. This can be achieved for instance when the optical communications network 100 is such that transmitting locking signals is only allowed in predefined time slots, whereas communications are allowed at any time. The DC analysing unit 403 may provide such measures of the contribution of the communication signal $S_{com}(t)$ on the DC component to a spectrum analysing unit 407 via a link 413.

In a variant, the DC analysing unit 403 receives the contribution of the communication signal $S_{com}(t)$ on the DC component from the spectrum analysing unit 407 via a link 414.

The spectrum analysing unit 407 receives from the BB analysing unit 405 via a link 410 an indication of the modulation scheme in use for generating the baseband signals, as well as samples of the signal received from the second filter 404. Knowing the modulation scheme in use, the spectrum analysing unit 407 is able to determine a spectrum pattern that shall match the signal $S_{com}(t)$. Knowing this pattern and using the samples, the spectrum analysing unit 407 performs an extrapolation in order to determine the contribution of the communication signal $S_{com}(t)$ on the DC component.

The spectrum analysing unit 407 may store the extrapolated contribution of the communication signal $S_{com}(t)$ on the DC component. The stored contribution can be reused later on for another DC analysis; it thus avoids reiterating the spectrum analysis of the communication signal $S_{com}(t)$. The spectrum analysing unit 407 may however reiterates the spectrum analysis of the communication signal $S_{com}(t)$ in order to refine the contribution of the communication signal $S_{com}(t)$ on the DC component.

In a preferred embodiment, the spectrum analysing unit 407 stores the contribution of the communication signal $S_{com}(t)$ on the DC component in association with an identifier of the optical communication device having transmitted the communication signal $S_{com}(t)$. The association is stored for a later determination of a presence of a locking signal in a received signal. The stored contribution of the communication signal $S_{com}(t)$ on the DC component is either extrapolated by spectrum analysis or received from the DC analysing unit 403 via the link 413. The identifier of the optical communication device having transmitted the communication signal $S_{com}(t)$ is received from the BB analysing unit 405 via the link 410. The BB analysing unit 405 obtains this identifier by decoding the communication signal $S_{com}(t)$, considering that the communication signal $S_{com}(t)$ comprises a message in which such identifier is stipulated. It can be noted that the BB analysing unit 405 is able to decode the communication signal $S_{com}(t)$ despite the presence of the locking signal $S_{lock}(t)$, as the contribution of the part C of the electrical signal provided by the photodiode 401 is mitigated by an appropriate definition of the ratio $S_c/S_l$, as already described.

The locking signal detection is performed over a given time period. The DC analysing unit 403, the BB analysing unit 405 and the spectrum analysing unit 407 are preferably synchronized with this given time period. It allows the units to provide consistent information to each other and it allows the spectrum analysing unit 407 to weight the contribution of the communication signal $S_{com}(t)$ on the DC component over said given time period. Indeed, over said given time period, the contribution of the communication signal $S_{com}(t)$ on the DC component may evolve. As the first filter 402 acts as an integrator over said given time period, the spectrum analysing unit 407 weights the contribution of the communication signal $S_{com}(t)$ on the DC component to provide to the DC analysing unit 403 via the link 414 consistent information with the measures of the DC components performed by the DC analysing unit 403.

The DC analysing unit 403 provides the locking signal $S_{lock}(t)$ to a locking signal processing unit 406 via a link 412 in charge of processing the locking protocol between the optical communication devices of the optical communications network 100. The BB analysing unit 405 provides via a link 411 the communication signal $S_{com}(t)$ to another stage (not shown on FIG. 4) of the optical receiver device in charge of processing the data exchanged between the optical communication devices of the optical communications network 100.

Considering that a typical launched optical power for the communication signal $S_{com}(t)$ is about 0 dBm, a mitigating Optical communication-to-Noise Locking Ratio of 36 dB would lead to a launched optical locking power about −36 dBm. Since the sensitivity of the infrared photodiode is for example about −53 dBm for a PIN infrared photodiode for an error probability equal to $10^{-9}$, it allows an optical power budget of about 17 dBm to allow performing frequency or wavelength locking for setting up a new communication in an optical communications network in which communications may already be setup, without disrupting such already-setup communications. This optical power budget is obtained by considering an integration over a single symbol time period. When a lower optical power budget is used, an integration over a longer time period would be required. Considering an APD infrared photodiode, the sensitivity is around 60 or even 70 dBm instead of 53 dBm, which leads to an increased optical power budget, about 24 or 34 dBm respectively. However, it should be noticed that APD infrared photodiodes are more costly than PIN infrared photodiodes.

Considering a mitigating Optical communication-to-Noise Locking Ratio of 36 dB, and considering that the analysis of the DC components is performed digitally, the related analogue to digital converter has to play with six bits more to distinguish a potential DC component resulting from the communication signal from a DC component resulting from the locking signal. This aspect is improved by the second embodiment present hereafter with regard to FIGS. 6 and 7.

Figure 5:
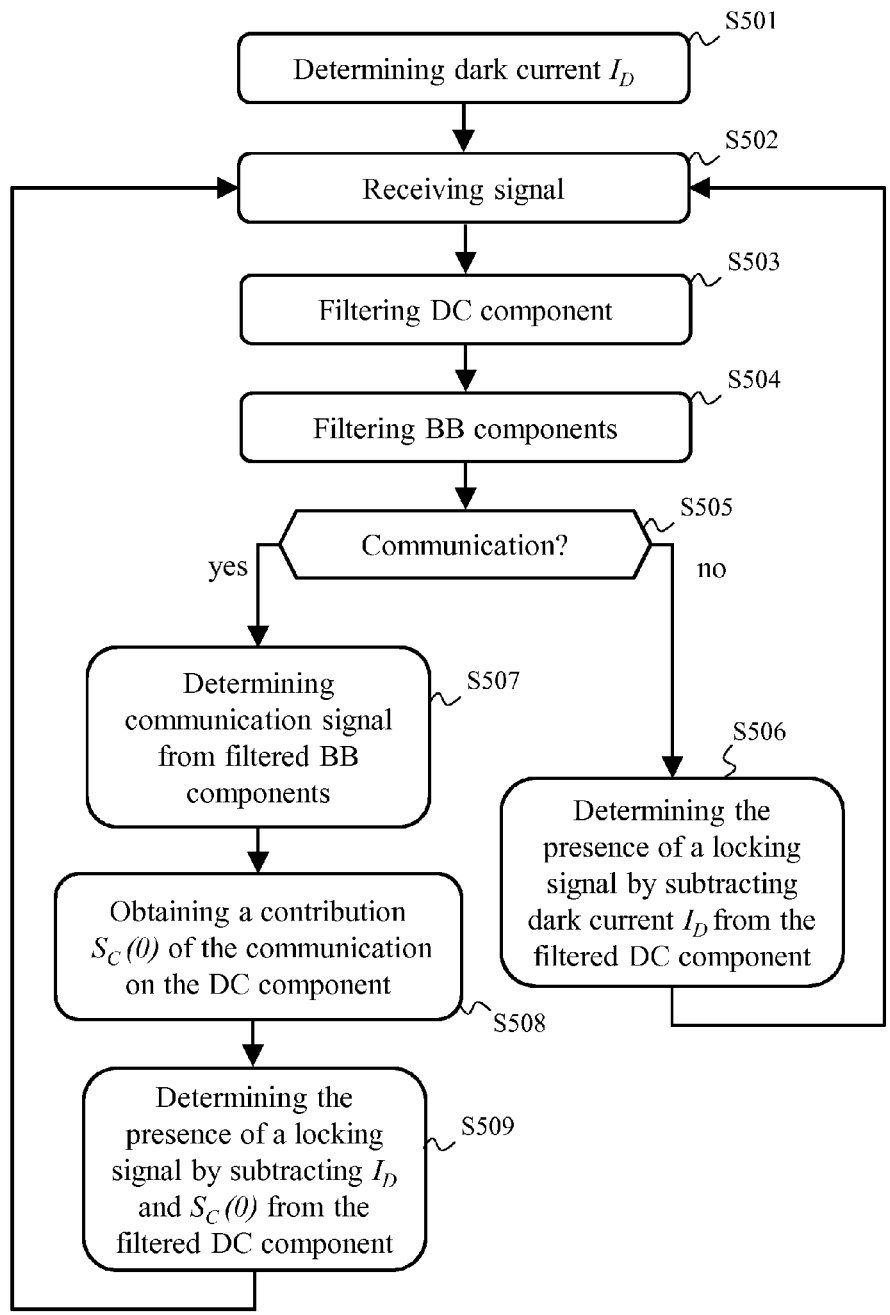
FIG. 5 schematically represents an algorithm performed by an optical receiver device, according to the first embodiment.

FIG. 5 schematically represents an algorithm performed by an optical receiver device, according to the first embodiment. The optical receiver device comprises a photodiode for receiving light signals transmitted via the optical communications network 100.

In a step S501, the optical receiver device determines the dark current $I_D$. In the step S501, no signal is being received by the optical receiver device. The dark current $I_D$ is determined, as already described, by measuring the DC component of the electrical signal provided by the photodiode, or by using a predefined value.

In a following step S502, the optical receiver device starts receiving a light signal, which is then converted into an electrical signal by the photodiode.

In a following step S503, the optical receiver device filters the DC component of the electrical signal. In other words, the optical receiver device obtains the DC component of the electrical signal.

In a following step S504, the optical receiver device filters the BB components of the electrical signal. In other words, the optical receiver device obtains the BB components of the electrical signal, if any.

In a following step S505, the optical receiver device checks whether the received signal comprises a communication signal $S_{com}(t)$, by analysing the filtered BB components. If a communication signal $S_{com}(t)$ is present in the received signal, then a step S507 is performed; otherwise, a step S506 is performed.

In the step S506, the optical receiver device determines the presence of the locking signal $S_{lock}(t)$ by subtracting the dark current $I_D$ determined in the step S501 from the DC component obtained in the step S503. Then the step S502 is repeated when light signals are received by the optical receiver device.

In the step S507, the optical receiver device determines the communication signal $S_{com}(t)$ from the BB components filtered in the step S504.

In the step S508, the optical receiver device determines the contribution, if any, of the communication signal $S_{com}(t)$ on the DC component. The contribution is either determined, as already described, by spectrum analysis or by DC component analysis in a time period during which no locking signal shall be transmitted throughout the optical communications network 100.

In a following step S509, the optical receiver device determines the presence of the locking signal $S_{lock}(t)$ by subtracting, from the DC component obtained in the step S503, the dark current $I_D$ determined in the step S501 and the contribution of the communication signal $S_{com}(t)$ on the DC component obtained in the step S508. In case the part C of the electrical signal provided by the photodiode contributes to the DC component, it shall be understood that the components related to the beating frequency are present only when a locking signal and a communication signal are present. Then the step S502 is repeated, when light signals are received by the optical receiver device.

Figure 6:
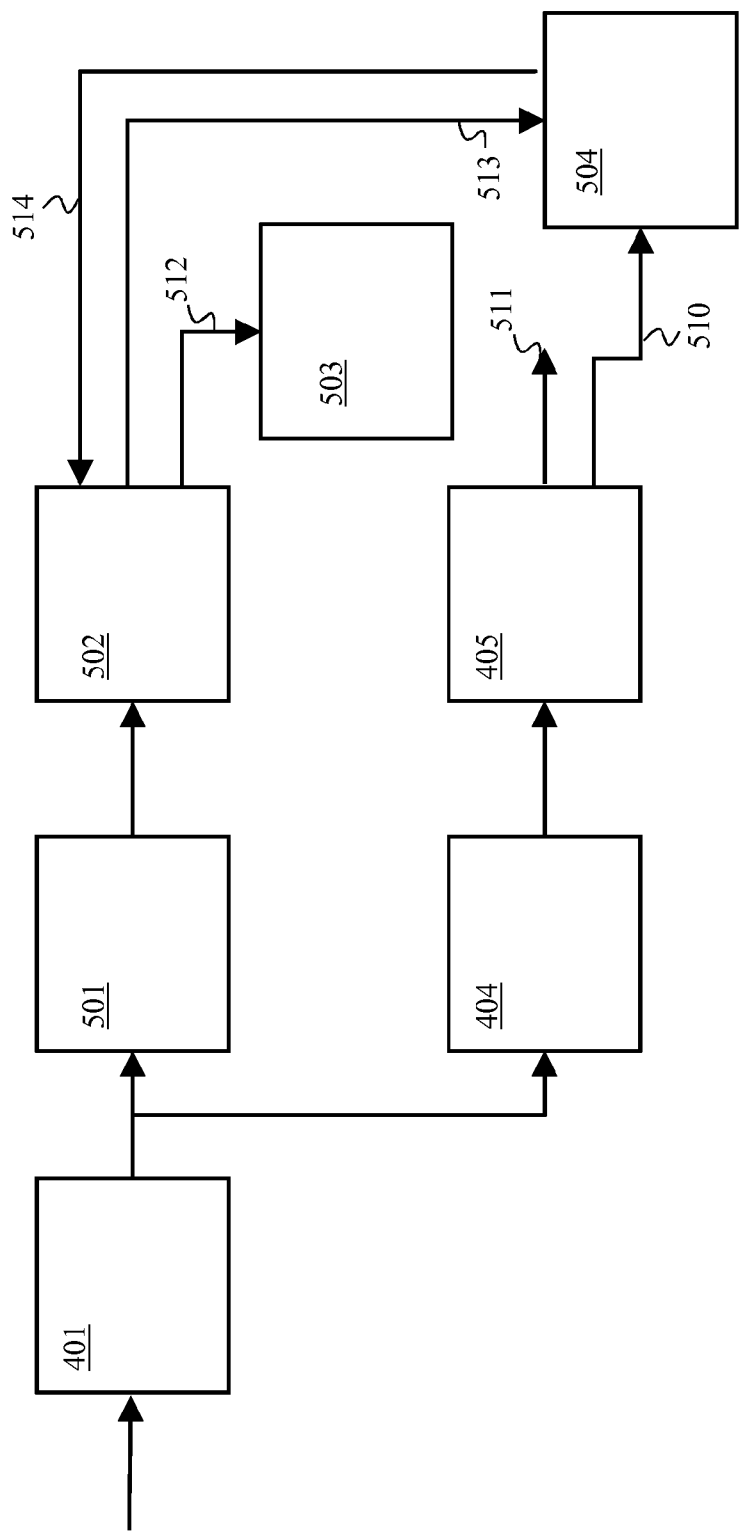
FIG. 6 schematically represents an architecture of the receiver control unit, according to a second embodiment.

FIG. 6 schematically represents an architecture of a receiver control unit of an optical communication device of the optical communications network 100, according to the second embodiment. The optical communication device is hereinafter referred to as optical receiver device.

The second embodiment is an alternative to the first embodiment to solve the problem of detecting a locking signal by an optical receiver device, while the optical receiver device is already in communication.

This second embodiment illustrates a situation in which the DC component resulting from the locking signal $S_{lock}(t)$ is null or in which the DC component resulting from the locking signal $S_{lock}(t)$ is mixed up with noise.

The receiver control unit comprises the already-mentioned photodiode 401, which converts the light signals in electrical signals and provides the electrical signals to the already-mentioned second filter 404 and a third filter 501. As in the first embodiment, the second filter 404 is connected to the BB analysing unit 405.

The third filter 501 is a band-pass filter filtering the frequencies at twice the frequency $\Omega$. For instance, the third filter has a nominal frequency equal to 100 MHz and a pass-band of 25 MHz. The third filter 501 provides the component at twice the frequency $\Omega$ to an out-of-band analysing unit 502.

The part B of the electrical signal provided by the photodiode 401 is therefore filtered by the third filter 501 and provided to the out-of-band analysing unit 502.

As already mentioned, the part C of the electrical signal provided by the photodiode 401 generates respective components related to the beating frequency $\delta\omega$. This may result in components at twice the frequency $\Omega$ and/or in components overlapping with BB components.

The communication signal $S_{com}(t)$ may also generate part of the component at twice the frequency $\Omega$, depending on the modulation scheme in use for generating the baseband signals.

The out-of-band analysing unit 502 determines the locking signal $S_{lock}(t)$ by analysing the component at twice the frequency $\Omega$ in the received signal. The contribution of the locking signal $S_{lock}(t)$ on the component at twice the frequency $\Omega$ are the components observed at twice the frequency $\Omega$ in the electrical signal provided by the photodiode 401 from which are subtracted the contribution, if any, of the communication signal $S_{com}(t)$ and the contribution, if any, of the signals related to the beating frequency $\delta\omega$.

It is therefore possible for the out-of-band analysing unit 502 to determine whether a locking signal $S_{lock}(t)$ is present by checking whether the component at twice the frequency $\Omega$ correspond only to the contribution, if any, of the communication signal $S_{com}(t)$. Indeed, if signals related to the beating frequency $\delta\omega$ contribute to the component at twice the frequency $\Omega$, it means that a locking signal is present.

The contribution of the communication signal $S_{com}(t)$ on the component at twice the frequency $\Omega$ is determined by measurement, when no locking signal $S_{com}(t)$ is received. This can be achieved for instance when the optical communications network 100 is such that transmitting locking signals is only allowed in predefined time slots, whereas communications are allowed at any time. The out-of-band analysing unit 502 may provide such measures of the contribution of the communication signal $S_{com}(t)$ on the component at twice the frequency $\Omega$ to a spectrum analysing unit 504 via a link 513.

In a variant, the out-of-band analysing unit 502 receives the contribution of the communication signal $S_{com}(t)$ on the component at twice the frequency $\Omega$ from the spectrum analysing unit 504 via a link 514.

The spectrum analysing unit 504 receives from the BB analysing unit 405 via a link 510 an indication of the modulation scheme in use for generating the baseband signals, as well as samples of the signal received from the second filter 404. Knowing the modulation scheme in use, the spectrum analysing unit 504 is able to determine a spectrum pattern that shall match the signal $S_{com}(t)$. Knowing this pattern and using the samples, the spectrum analysing unit 504 performs an extrapolation in order to determine the contribution of the communication signal $S_{com}(t)$ on the component at twice the frequency $\Omega$. The contribution of the communication signal $S_{com}(t)$ on the DC component may also be used to refine the extrapolation. In this case, the receiver control unit comprises the first filter 402 and the DC analysing unit 403, which provides to the spectrum analysing unit 504 a measurement of the contribution of the communication signal $S_{com}(t)$ on the DC component, as already described with regard to FIG. 4.

The spectrum analysing unit 504 may store the extrapolated contribution of the communication signal $S_{com}(t)$ on the component at twice the frequency $\Omega$ in association with an identifier of the optical communication device having transmitted the communication signal $S_{com}(t)$. The association is stored for a later determination of a presence of a locking signal in a received signal. It thus avoids reiterating the spectrum analysis of the communication signal $S_{com}(t)$. The spectrum analysing unit 504 may however reiterate the spectrum analysis of the communication signal $S_{com}(t)$ in order to refine the contribution of the communication signal $S_{com}(t)$ on the on the component at twice the frequency $\Omega$.

In a preferred embodiment, the spectrum analysing unit 504 stores the contribution of the communication signal $S_{com}(t)$ on the component at twice the frequency $\Omega$ in association with an identifier of the optical communication device having transmitted the communication signal $S_{com}(t)$. The stored contribution of the communication signal $S_{com}(t)$ on the component at twice the frequency $\Omega$ is either extrapolated by spectrum analysis or received from the out-of-band analysing unit 502 via the link 513. The identifier of the optical communication device having transmitted the communication signal $S_{com}(t)$ is received from the BB analysing unit 405 via the link 510. The BB analysing unit 405 obtains this identifier by decoding the communication signal $S_{com}(t)$, considering that the communication signal $S_{com}(t)$ comprises a message in which such identifier is stipulated. It can be noted that the BB analysing unit 405 is able to decode the communication signal $S_{com}(t)$ despite the presence of the locking signal $S_{lock}(t)$, as the contribution of the part C of the electrical signal provided by the photodiode 401 is mitigated.

At maximum, the contribution of the communication signal $S_{com}(t)$ on the component at twice the frequency $\Omega$ is evaluated as follows:

$$\frac{1}{2} S'_c \times \frac{\Delta B_f}{B_b}$$

wherein $S'_c$ is a measure of the spectral power of the communication signal $S_{com}(t)$, for instance the mean value of the spectral power density, and wherein $\Delta B_f$ represents the width of the third passband filter 501 and $B_b$ represents the width between 0 and the upper cut-off frequency of the second passband filter 404.

At maximum, the contribution of the signals related to the beating frequency $\delta\omega$ on the component at twice the frequency $\Omega$ is approximated as follows:

$$\sqrt{S'_c} \times \sqrt{S'_l} \times \frac{\Delta B_f}{B_b}$$

Similarly to $S'_c$ for the communication signal, $S'_l$ represents a measure of the spectral power of the locking signal $S_{lock}(t)$.

It can be seen from the expressions above that the term $\Delta B_f/B_b$ brings an attenuation factor, which increases the OSNR for detecting the locking signal. Indeed, the width of the third passband filter 501 is low compared to the value of the upper limit of the baseband.

As already mentioned with regard to the first embodiment, using amplitude modulation to transmit the locking signals and the communication signals, a ratio $S_c/S_l$ greater than 18 dB allows not perturbing the decision making process regarding the modulation state of a received communication signal. With such a ratio between the maximum amplitude of the locking signal $S_{lock}(t)$ and the maximum amplitude of the communication signal $S_{com}(t)$, the impact of the components corresponding to the part C of the electrical signal provided by the photodiode on the communication signal $S_{com}(t)$ is limited, when such components are located in the baseband. Considering the already-mentioned mitigating Optical communication-to-Noise Locking Ratio of 36 dB, although the analysis complexity is higher, the capability of the out-of-band analysis for detecting the locking signal is better than the capability obtained while considering the first embodiment. For instance, if the out-of-band analysis is digitally performed, the related analogue to digital converter has to play with one or at worst two bits more to distinguish a potential DC component resulting from the communication signal from a DC component resulting from the locking signal.

The out-of-band analysing unit 502 provides via a link 512 the locking signal $S_{lock}(t)$ to a locking signal processing unit 503 in charge of processing the locking protocol between the optical communication devices of the optical communications network 100. The BB analysing unit 405 provides via a link 511 the communication signal $S_{com}(t)$ to another stage (not shown on FIG. 6) of the optical receiver device in charge of processing the data exchanged between the optical communication devices of the optical communications network 100.

Figure 7:
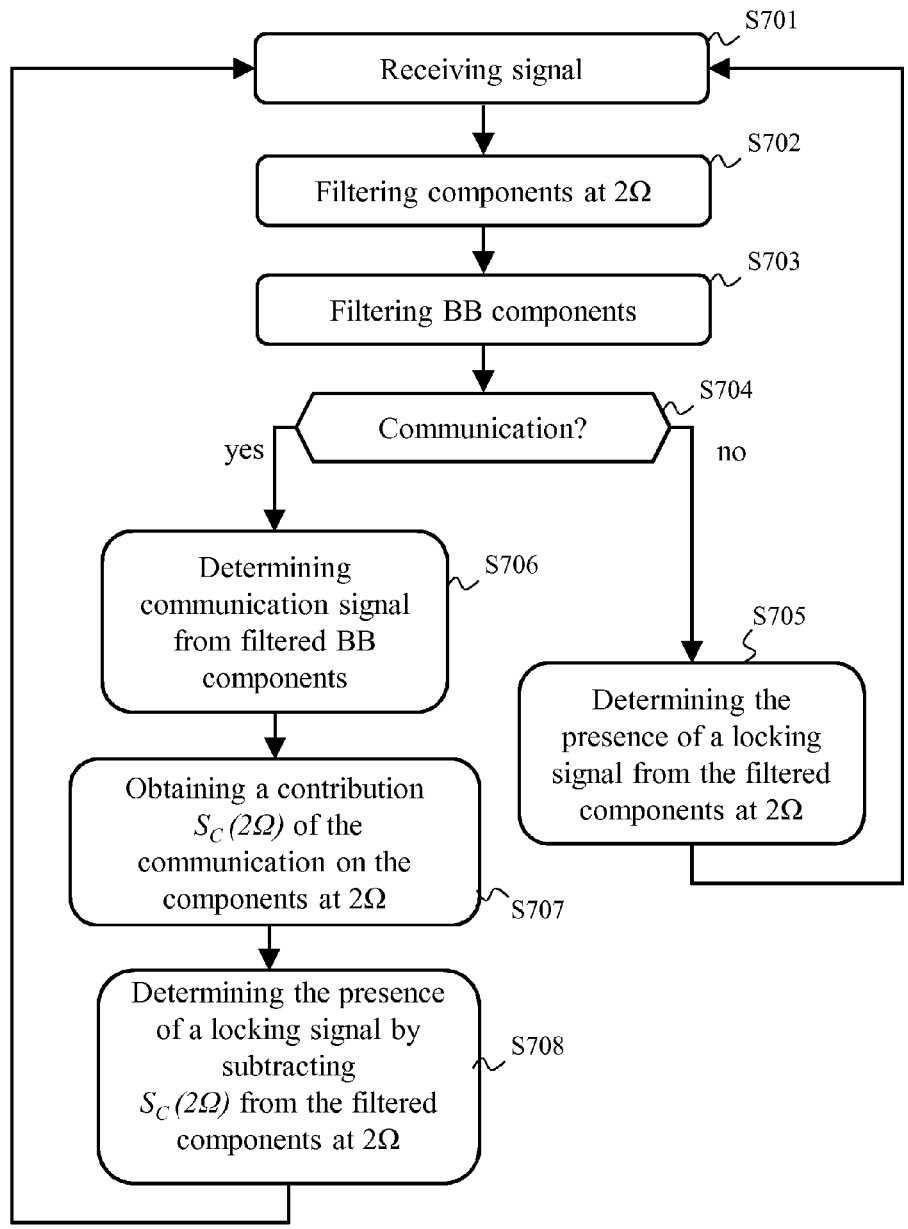
FIG. 7 schematically represents an algorithm performed by the optical receiver device, according to the second embodiment.

FIG. 7 schematically represents an algorithm performed by an optical receiver device, according to the second embodiment. The optical receiver device comprises a photodiode for receiving light signals transmitted via the optical communications network 100.

In a step S701, the optical receiver device starts receiving a light signal, which is then converted into an electrical signal by the photodiode.

In a following step S702, the optical receiver device filters the components, of the electrical signal, at twice the frequency $\Omega$. In other words, the optical receiver device obtains the components, of the electrical signal, at twice the frequency $\Omega$.

In a following step S703, the optical receiver device filters the BB components of the electrical signal. In other words, the optical receiver device obtains the BB components of the electrical signal, if any.

In a following step S704, the optical receiver device checks whether the received signal comprises a communication signal $S_{com}(t)$, by analysing the filtered BB components. If a communication signal $S_{com}(t)$ is present in the received signal, then a step S706 is performed; otherwise, a step S705 is performed.

In the step S705, the optical receiver device determines the locking signal $S_{lock}(t)$ from the component at twice the frequency $\Omega$ filtered in the step S702. Then the step S701 is repeated, when light signals are received by the optical receiver device.

In the step S706, the optical receiver device determines the communication signal $S_{com}(t)$ from the BB components filtered in the step S504.

In a following step S707, the optical receiver device determines the contribution, if any, of the communication signal $S_{com}(t)$ on the component at twice the frequency $\Omega$. The contribution is either determined, as already described, by spectrum analysis or by analysis of the component at twice the frequency $\Omega$ in a time period during which no locking signal shall be transmitted throughout the optical communications network 100.

In a following step S708, the optical receiver device determines the presence of the locking signal $S_{lock}(t)$ by subtracting, from the component at twice the frequency $\Omega$ filtered in the step S702, the contribution of the communication signal $S_{com}(t)$ on the component at twice the frequency $\Omega$ obtained in the step S707. In case the part C of the electrical signal provided by the photodiode contributes to the component at twice the frequency $\Omega$, it shall be understood that the components related to the beating frequency are present only when a locking signal and a communication signal are present. Then the step S701 is repeated, when light signals are received by the optical receiver device.

Figure 8:
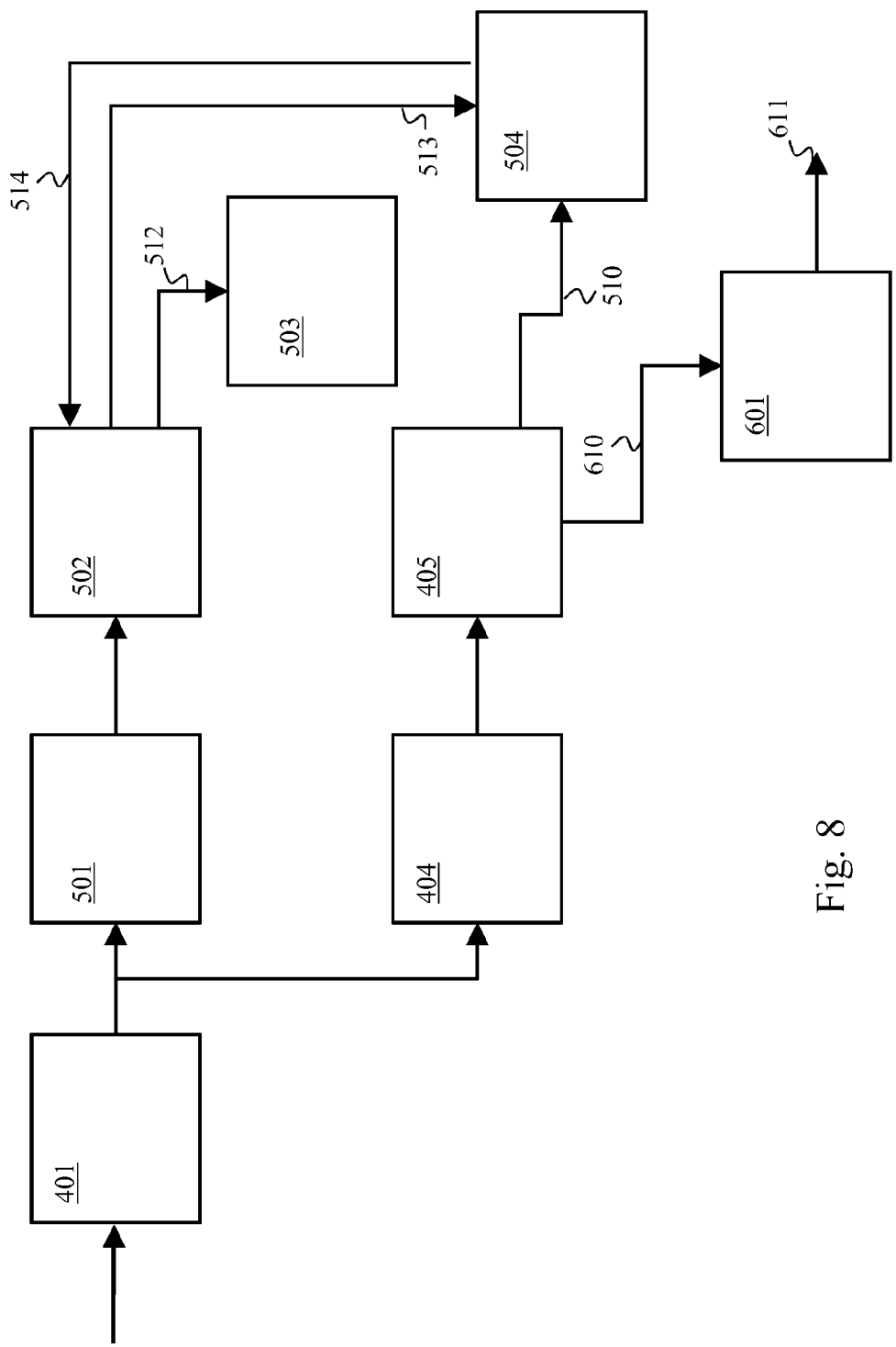
FIG. 8 schematically represents an architecture of the receiver control unit, according to a third embodiment.

FIG. 8 schematically represents an architecture of a receiver control unit of an optical communication device of the optical communications network 100, according to the third embodiment. The optical communication device is hereinafter referred to as optical receiver device.

The third embodiment is an improvement of the second embodiment to solve the problem of detecting a locking signal by an optical receiver device, while the optical receiver device is already in communication. The third embodiment further allows determining the locking signal.

This third embodiment illustrates a situation in which the DC component resulting from the locking signal $S_{lock}(t)$ is null or in which the DC component resulting from the locking signal $S_{lock}(t)$ is mixed up with noise.

The receiver control unit comprises the already-mentioned photodiode 401, which converts the light signals in electrical signals and provides the electrical signals to the already-mentioned second filter 404 and the already-mentioned third filter 501. As in the second embodiment, the second filter 404 is connected to the BB analysing unit 405 and the third filter 501 is connected to the out-of-band analysing unit 502.

As already mentioned, the part C of the electrical signal provided by the photodiode 401 generates respective components related to the beating frequency $\delta\omega$. This may result in component at twice the frequency $\Omega$ and/or in components overlapping with BB components.

The out-of-band analysing unit 502 determines the locking signal $S_{lock}(t)$ by analysing the component at twice the frequency $\Omega$ in the received signal. The contribution of the locking signal $S_{lock}(t)$ on the component at twice the frequency $\Omega$ is the component observed at twice the frequency $\Omega$ in the electrical signal provided by the photodiode 401 from which are subtracted the contribution, if any, of the communication signal $S_{com}(t)$ and the contribution, if any, of the signals related to the beating frequency $\delta\omega$.

As already mentioned with regard to FIG. 6, the contribution of the communication signal $S_{com}(t)$ on the component at twice the frequency $\Omega$ is determined by measurement, when there is no locking signal $S_{com}(t)$ received. The out-of-band analysing unit 502 may provide such measures of the contribution of the communication signal $S_{com}(t)$ on the component at twice the frequency $\Omega$ to the spectrum analysing unit 504 via the link 513. In a variant, the out-of-band analysing unit 502 receives the contribution of the communication signal $S_{com}(t)$ on the component at twice the frequency $\Omega$ from the spectrum analysing unit 504 via the link 514. In a preferred embodiment, the spectrum analysing unit 504 stores the contribution of the communication signal $S_{com}(t)$ on the component at twice the frequency $\Omega$ in association with an identifier of the optical communication device having transmitted the communication signal $S_{com}(t)$.

The contribution of the signals related to the beating frequency $\delta\omega$ may be determined by knowing the values $\delta\omega$ and/or $\Omega\pm\delta\omega$ and $\phi\pm\delta\phi$. To achieve this, the receiver control unit comprises a tone analysing unit 601. The tone analysing unit 601 receives from the BB analysing unit 405, via a link 610, samples of the signal received from the second filter 404. The tone analysing unit 601 attempts to retrieve at least one tone present in the communication signal $S_{com}(t)$, i.e. that has been inserted in the communication signal $S_{com}(t)$ by the optical communication device having transmitted the communication signal $S_{com}(t)$. The effect of the beating frequency $\delta\omega$ and the phase shift $\delta\omega$ is that these tones are subject to shifting within the spectrum. The comparison of the frequencies at which these tones are expected to be present and the frequencies at which they are effectively present allows determining the beating frequency $\delta\omega$. In order to determine the position in the spectrum of the tones in the received signal, the tone analysing unit 601 applies for instance a FFT (Fast Fourier Transform). To update the determining of the position in the spectrum of the tones in the received signal, the tone analysing unit 601 applies again the FFT, for instance on a periodical basis. In a variant, the tone analysing unit 601 applies a sliding FFT over a predefined time window, which allows reducing the computation time period. The presence of tones in the spectrum can be determined by computing the modulus of the FFT components, the tones corresponding to singular elements in the FFT components. By identifying at which frequencies the tones are present in the received signal, the beating frequency $\delta\omega$ can be deduced. By computing the inverse tangent (arctan) of the imaginary and real parts of the FFT components that form these singular elements, the phase shift $\delta\phi$ can be determined. The number of samples in the received signal used to perform the FFT may be adjusted to find a trade-off between computation time period and accuracy of the estimation of the beating frequency $\delta\omega$ and the phase shift $\delta\phi$. As another example, in the analogue domain, the position in the spectrum of the tones in the received signal may be determined by detecting resonances in the received signal using a tunable filter.

The tone analysing unit 601 is therefore able to determine the communication signal $S_{com}(t)$ using the following formula:

$$S_{com}(t) = \frac{-S_{lock}(t)(\cos(\delta\omega t + \delta\varphi))}{+\sqrt{2S_{rx}(t) + (S_{lock}(t)\cos(\delta\omega t + \delta\varphi))^2}}$$

wherein $S_{rx}(t)$ represents the received signal after filtering performed by the second filter 404.

In addition, the tone analysing unit 601 provides the beating frequency $\delta\omega$ and the phase shift $\delta\phi$ to the out-of-band analysing unit 502 via a link 612. The out-of-band analysing unit 502 is therefore able to determine the locking signal $S_{lock}(t)$ from the component observed at twice the frequency $\Omega$ and from the beating frequency $\delta\omega$ and the phase shift $\delta\phi$.

The out-of-band analysing unit 502 is then able to fully determine the locking signal $S_{lock}(t)$ by additionally obtaining the contribution of the locking signal $S_{lock}(t)$ on the DC component. In this case, the receiver control unit comprises the DC analysing unit 403, which provides to the out-of-band analysing unit 502 the contribution of the locking signal $S_{lock}(t)$ on the DC component.

In a variant, an iterative process is performed until convergence, or until a predefined number of iterations is reached. In such an iterative process, the out-of-band analysing unit 502 provides via a link 613 a first estimate of the locking signal $S_{lock}(t)$ on the basis of the beating frequency $\delta\omega$ and the phase shift $\delta\phi$ provided by the tone analysing unit 601 via the link 612. The tone analysing unit 601 determines an estimate of the communication signal $S_{com}(t)$ on the basis of the estimate of the locking signal $S_{lock}(t)$, and provides this estimate of the communication signal $S_{com}(t)$ to the out-of-band analysing unit 502 via the link 612. The out-of-band analysing unit 502 then provides to the tone analysing unit 601, via the link 613, another estimate of the locking signal $S_{lock}(t)$ on the basis of the estimate of the communication signal $S_{com}(t)$, and so on until convergence.

The out-of-band analysing unit 502 provides, via the link 512, the locking signal $S_{lock}(t)$ to the locking signal processing unit 503 in charge of processing the locking protocol between the optical communication devices of the optical communications network 100. The tone analysing unit 601 provides, via a link 611, the communication signal $S_{com}(t)$ to another stage (not shown on FIG. 8) of the optical receiver device in charge of processing the data exchanged between the optical communication devices of the optical communications network 100.

According to this third embodiment, since the potential beating terms in BB can be retrieved and compensated for whatever the Optical communication-to-Noise Locking Ratio is, there is no limitation in terms of launched power of the locking signal, so there is no limitation in terms of optical power budget to perform locking operation even in the presence of a simultaneous communication signal.

Moreover, dealing with the capability of detection of the locking signal, since it is based on the same filtering at twice the frequency $\Omega$, it is as high as the capability obtained in the second embodiment.

Figure 9:
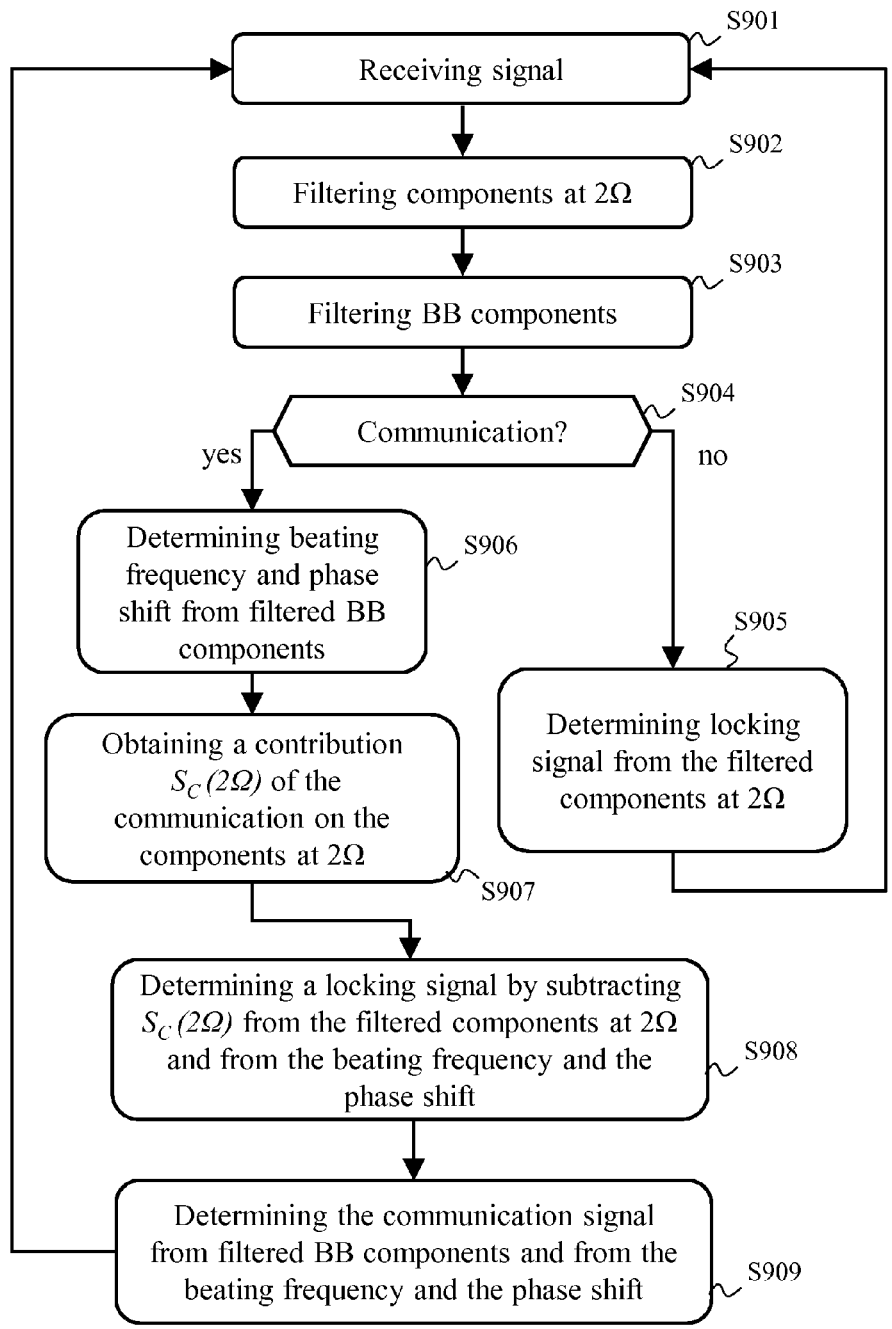
FIG. 9 schematically represents an algorithm performed by the optical receiver device, according to the third embodiment.

FIG. 9 schematically represents an algorithm performed by an optical receiver device, according to the third embodiment. The optical receiver device comprises a photodiode for receiving light signals transmitted via the optical communications network 100.

In a step S901, the optical receiver device starts receiving a light signal, which is then converted into an electrical signal by the photodiode.

In a following step S902, the optical receiver device filters the components, of the electrical signal, at twice the frequency Ω In other words, the optical receiver device obtains the components, of the electrical signal, at twice the frequency Ω.

In a following step S903, the optical receiver device filters the BB components of the electrical signal. In other words, the optical receiver device obtains the BB components of the electrical signal, if any.

In a following step S904, the optical receiver device checks whether the received signal comprises a communication signal $S_{com}(t)$, by analysing the filtered BB components. If a communication signal $S_{com}(t)$ is present in the received signal, then a step S906 is performed; otherwise, a step S905 is performed.

In the step S905, the optical receiver device determines the locking signal $S_{lock}(t)$ from the component at twice the frequency Ω filtered in the step S902. Then the step S901 is repeated, when light signals are received by the optical receiver device.

In the step S906, the optical receiver device determines the beating frequency δω and the phase shift δφ from the BB components filtered in the step S504. The beating frequency δω and the phase shift δφ are determined by retrieving tones in the received signal, as already described with regard to FIG. 8.

In a step S907, the optical receiver device determines the contribution, if any, of the communication signal $S_{com}(t)$ on the component at twice the frequency Q. The contribution is either determined, as already described, by spectrum analysis or by analysis of the component at twice the frequency Ω in a time period during which no locking signal shall be transmitted throughout the optical communications network 100.

In a following step S908, the optical receiver device determines the locking signal $S_{lock}(t)$ by subtracting, from the component at twice the frequency Ω filtered in the step S902, the contribution of the communication signal $S_{com}(t)$ on the component at twice the frequency Ω obtained in the step S907 and the contribution related to the signals related to the beating frequency δω, as already described with regard to FIG. 8. In other words, the optical receiver device determines the locking signal $S_{lock}(t)$ on the basis of the contribution of the communication signal $S_{com}(t)$ on the component at twice the frequency Ω and of the beating frequency δω and the phase shift δφ. In a variant, the optical receiver device only determines the presence of the locking signal $S_{lock}(t)$.

In a following step S909, the optical receiver device determines the communication signal $S_{com}(t)$, on the basis of the locking signal $S_{lock}(t)$ and of the beating frequency δω and the phase shift δφ, as already described with regard to FIG. 8. The communication signal $S_{com}(t)$ and the locking signal $S_{lock}(t)$ may be refined using an iteration process, as already described with regard to FIG. 8. Then the step S901 is repeated, when light signals are received by the optical receiver device.

The invention claimed is:

1. A method for determining a presence of a locking signal in a signal received by an optical receiver device, the optical receiver device configured to be used in an optical communications network, the locking signal being a signal exchanged by optical communication devices of the optical communications network in a phase preceding setting up communications between the optical communication devices, wherein the optical receiver device performs:
obtaining, from the received signal, a direct current component or a component at twice a frequency at which the locking signal is supposed to be modulated;
determining a presence in the received signal of a communication signal resulting from a communication between optical communication devices of the optical communications network;
and, when the presence of the communication signal is detected in the received signal:
determining a contribution of the communication signal on the direct current component or respectively on the component at twice a frequency at which the locking signal is supposed to be modulated; and
determining whether the locking signal is present in the received signal by subtracting at least, from the direct current component or respectively from the component at twice a frequency at which the locking signal is supposed to be modulated, the determined contribution of the communication signal.

2. The method according to claim 1, wherein the optical receiver device is configured to receive signals via a photodiode, and the determining whether the locking signal is present in the received signal further comprises, when subtracting from the direct current component, further subtracting a dark current resulting from the photodiode.

3. The method according to claim 2, wherein the determining the contribution of the communication signal on the direct current component comprises:
obtaining a direct current component of the received signal, when the received signal is received during a time period during which no locking signal is supposed to be received; and
subtracting, from the obtained direct current component, the dark current resulting from the photodiode.

4. The method according to claim 3, wherein the optical receiver device further performs:
associating the obtained contribution of the communication signal on the direct current component with an identifier of an optical transmitter device having transmitted the communication signal throughout the optical communications network; and
storing the associated contribution and identifier, for a later determination of a presence of a locking signal in a received signal.

5. The method according to claim 4, further comprising, when the presence of the communication signal is detected in the received signal:
determining positions of tones in the received signal, the tones being supposed to be present in each communication signal; and
determining a beating frequency and a phase shift on the basis of the determined positions of the tones, the beating frequency being a difference between a first carrier frequency used to transmit the communication signal throughout the optical communications network and a second carrier frequency used to transmit the locking signal throughout the optical communications network, the phase shift being a difference between a first phase used to transmit the communication signal throughout the optical communications network and a second phase used to transmit the locking signal throughout the optical communications network;
and wherein the determining whether the locking signal is present in the received signal is further performed on the basis of the determined beating frequency and phase shift.

6. The method according to claim 2, wherein the determining the contribution of the communication signal on the direct current component comprises:

obtaining an indication of a modulation scheme in use for transmitting the communication signal between optical communication devices;

obtaining a spectrum pattern on the basis of the obtained indication of the modulation scheme in use; and extrapolating the contribution of the communication signal on the direct current component on the basis of the obtained pattern and samples of the received signal.

7. The method according to claim 1, wherein the determining the contribution of the communication signal on the component at twice the frequency at which the locking signal is supposed to be modulated comprises obtaining a component of the received signal at twice the frequency at which the locking signal is supposed to be modulated, when the received signal is received during a time period during which no locking signal is supposed to be received.

8. The method according to claim 7, wherein the optical receiver device further performs:

associating the obtained contribution of the communication signal on the component at twice the frequency at which the locking signal is supposed to be modulated with an identifier of an optical transmitter device having transmitted the communication signal throughout the optical communications network; and storing the associated contribution and identifier, for a later determination of a presence of a locking signal in a received signal.

9. The method according to claim 1, wherein the determining the contribution of the communication signal on the component at twice the frequency at which the locking signal is supposed to be modulated comprises:

obtaining an indication of a modulation scheme in use for transmitting the communication signal between optical communication devices;

obtaining a spectrum pattern on the basis of the obtained indication of the modulation scheme in use; and extrapolating the contribution of the communication signal on the component at twice the frequency at which the locking signal is supposed to be modulated on the basis of at least the obtained pattern and samples of the received signal.

10. The method according to claim 9, wherein the extrapolating the contribution of the communication signal on the component at twice the frequency at which the locking signal is supposed to be modulated is further performed on the basis of a contribution of the communication signal on a direct current component of the received signal.

11. The method according to claim 1, wherein, for generating the locking signal, an optical transmitter device performs:

obtaining a carrier frequency to transmit the locking signal throughout the optical communications network;

obtaining a modulated signal, the signal being modulated at a frequency that is lower than a lower limit of a baseband frequency range corresponding to communication signals transmitted throughout the optical communications network;

apodizing the modulated signal; and modulating the apodized signal on the basis of the obtained carrier frequency.

12. A device for determining a presence of a locking signal in a signal received by the device, the device configured to be used in an optical communications network, the locking signal being a signal exchanged by optical communication devices of the optical communications network in a phase preceding setting up communications between the optical communication devices, wherein the device is configured to perform:

obtaining, from the received signal, a direct current component or a component at twice a frequency at which the locking signal is supposed to be modulated; and determining a presence in the received signal of a communication signal resulting from a communication between optical communication devices of the optical communications network;

and, when the presence of the communication signal is detected in the received signal, the device is further configured to perform:

determining a contribution of the communication signal on the direct current component or respectively on the component at twice a frequency at which the locking signal is supposed to be modulated; and determining whether the locking signal is present in the received signal by subtracting, from the direct current component or respectively from the component at twice a frequency at which the locking signal is supposed to be modulated, the determined contribution of the communication signal.

13. The device according to claim 12, wherein, the device is configured to receive signals via a photodiode, and the determining whether the locking signal is present in the received signal further comprises, when subtracting from the direct current component, further subtracting a dark current resulting from the photodiode.

14. The device according to claim 12, further configured to perform, when the presence of the communication signal is detected in the received signal:

determining positions of tones in the received signal, the tones being supposed to be present in each communication signal; and determining a beating frequency and a phase shift on the basis of the determined positions of the tones, the beating frequency being a difference between a first carrier frequency used to transmit the communication signal throughout the optical communications network and a second carrier frequency used to transmit the locking signal throughout the optical communications network, the phase shift being a difference between a first phase used to transmit the communication signal throughout the optical communications network and a second phase used to transmit the locking signal throughout the optical communications network;

and wherein determining whether the locking signal is present in the received signal further comprises, when subtracting from the component at twice a frequency at which the locking signal is supposed to be modulated, performing the determining on the basis of the determined beating frequency and phase shift.

15. A system for determining a presence of a locking signal in a signal received by an optical receiver device according to claim 12, the system comprising the optical receiver device and an optical transmitter device, wherein, for generating the locking signal, the optical transmitter device is configured to perform:

obtaining a carrier frequency to transmit the locking signal throughout the optical communications network;

obtaining a modulated signal, the signal being modulated at a frequency that is lower than a lower limit of a baseband frequency range corresponding to communication signals transmitted throughout the optical communications network;

apodizing the modulated signal; and modulating the apodized signal on the basis of the obtained carrier frequency.

* * * * *